US009014113B2

(12) United States Patent
Bontu et al.

(10) Patent No.: US 9,014,113 B2
(45) Date of Patent: Apr. 21, 2015

(54) USER EQUIPMENT ARCHITECTURE FOR INTER-DEVICE COMMUNICATION IN WIRELESS COMMUNICATION SYSTEMS

(71) Applicants: Chandra Sekhar Bontu, Kanata (CA); Yi Song, Irving, TX (US); Zhijun Cai, Irving, TX (US)

(72) Inventors: Chandra Sekhar Bontu, Kanata (CA); Yi Song, Irving, TX (US); Zhijun Cai, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 14 days.

(21) Appl. No.: 13/624,736

(22) Filed: Sep. 21, 2012

(65) Prior Publication Data

US 2014/0086153 A1    Mar. 27, 2014

(51) Int. Cl.
 *H04W 4/00* (2009.01)
 *H04W 76/02* (2009.01)
(52) U.S. Cl.
 CPC ............ *H04W 4/005* (2013.01); *H04W 76/023* (2013.01)
 USPC ......................................................... 370/329
(58) Field of Classification Search
 CPC . H04W 76/02; H04W 76/023; H04W 76/048; H04W 4/005
 USPC .................................. 370/252, 311, 328–332
 See application file for complete search history.

(56) References Cited

U.S. PATENT DOCUMENTS

| 8,515,500 | B2 * | 8/2013 | Das et al. ....................... 455/574 |
| 8,582,593 | B2 | 11/2013 | Chen et al. |
| 8,631,466 | B2 | 1/2014 | Cha et al. |
| 2002/0111144 | A1 | 8/2002 | Schiff |
| 2004/0209634 | A1 | 10/2004 | Hrastar |
| 2005/0026597 | A1 | 2/2005 | Kim et al. |
| 2005/0111383 | A1 | 5/2005 | Grob et al. |
| 2005/0239451 | A1 | 10/2005 | Periyalwar et al. |
| 2006/0075263 | A1 | 4/2006 | Taylor |
| 2006/0190470 | A1 | 8/2006 | Lemnotis |

(Continued)

FOREIGN PATENT DOCUMENTS

| CN | 102340829 | 2/2012 |
| WO | 00/27045 | 5/2000 |

(Continued)

OTHER PUBLICATIONS

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

(Continued)

*Primary Examiner* — Kerri Rose
(74) *Attorney, Agent, or Firm* — Fish & Richardson P.C.

(57) ABSTRACT

User equipment (UE) architecture for inter-device communication in wireless communication systems is provided. A UE may communicate directly with another UE over a direct inter-device communication link when they are located in proximity. Long term evolution (LTE) downlink or uplink radio resources may be used for communications over the inter-device communication link. The UE may simultaneously maintain an active communication link with its serving base station while communicating with other UEs over the inter-device communication link. To communicate with the base station and other UEs simultaneously, the UE may include additional transmit or receive chain to support the inter-device communications over the inter-device communication link.

27 Claims, 7 Drawing Sheets

(56) References Cited

U.S. PATENT DOCUMENTS

| | | | |
|---|---|---|---|
| 2007/0129076 A1 | 6/2007 | Cho et al. | |
| 2008/0002658 A1 | 1/2008 | Soliman | |
| 2008/0069063 A1 | 3/2008 | Li et al. | |
| 2009/0119776 A1 | 5/2009 | Palnitkar et al. | |
| 2010/0009675 A1 | 1/2010 | Wijting et al. | |
| 2010/0095123 A1 | 4/2010 | He | |
| 2010/0240312 A1 | 9/2010 | Peng et al. | |
| 2010/0279672 A1* | 11/2010 | Koskela et al. | 455/418 |
| 2011/0081908 A1 | 4/2011 | Michaelis et al. | |
| 2011/0143771 A1 | 6/2011 | Edge et al. | |
| 2011/0145421 A1 | 6/2011 | Yao et al. | |
| 2011/0147462 A1 | 6/2011 | Speich | |
| 2011/0159799 A1 | 6/2011 | Chen et al. | |
| 2011/0194530 A1* | 8/2011 | Tinnakornsrisuphap et al. | 370/331 |
| 2011/0258313 A1 | 10/2011 | Mallik et al. | |
| 2011/0268004 A1* | 11/2011 | Doppler et al. | 370/311 |
| 2011/0275382 A1 | 11/2011 | Hakola et al. | |
| 2011/0294474 A1 | 12/2011 | Barany et al. | |
| 2011/0317569 A1 | 12/2011 | Kneckt et al. | |
| 2012/0051315 A1 | 3/2012 | Wang et al. | |
| 2012/0163235 A1 | 6/2012 | Ho et al. | |
| 2012/0163252 A1 | 6/2012 | Ahn et al. | |
| 2012/0179789 A1 | 7/2012 | Griot et al. | |
| 2013/0003629 A1* | 1/2013 | Jeong et al. | 370/311 |
| 2013/0315196 A1 | 11/2013 | Lim et al. | |
| 2013/0329689 A1 | 12/2013 | Choi et al. | |
| 2014/0010175 A1 | 1/2014 | Chiu | |
| 2014/0122607 A1 | 5/2014 | Fodor et al. | |
| 2014/0140296 A1* | 5/2014 | Choi et al. | 370/329 |
| 2014/0153390 A1 | 6/2014 | Ishii et al. | |

FOREIGN PATENT DOCUMENTS

| | | |
|---|---|---|
| WO | 2009/138820 | 11/2009 |
| WO | 2010/007498 | 1/2010 |
| WO | 2010059856 A1 | 5/2010 |
| WO | 2011/036507 | 3/2011 |
| WO | 2011/147462 | 12/2011 |
| WO | 2012/052911 | 4/2012 |
| WO | 2012/088470 | 6/2012 |

OTHER PUBLICATIONS

3GPP TS 36.211 V10.3.0 (Sep. 2011) Technical Specification: Evolved Universal Terrestrial Radio Access (E-UTRA); Physical Channels and Modulation (Release 10).

3GPP TS 36.212 V10.1.0 (Mar. 2011) Technical Specification: Evolved Universal Terrestrial Radio Access (E-UTRA); Multiplexing and channel coding (Release 10).

3GPP TS 36.213 V10.1.0 (Mar. 2011) Technical Specification: Evolved Universal Terrestrial Radio Access (E-UTRA); Physical layer procedures (Release 10).

3GPP TS 36.331 V10.1.0 (Mar. 2011) Technical Specification: Evolved Universal Terrestrial Radio Access (E-UTRA); Radio Resource Control (RRC); Protocol specification (Release 10).

International Search Report for Application No. PCT/US2013/026382, dated Jul. 11, 2013, 17 pages.

Intel: "ProSe Use Case for Undirectional D2D Communication," 3GPP Draft; S1-120065; 3GPP TSG-SA WG1 Meeting #57, Kyoto, Japan; Feb. 13-17, 2012, 3 page.

Intel: "Operator Managed and Operator Assisted D2D," 3GPP Draft; S1-120063; 3GPP TSG-SA WG1 Meeting #57, Kyoto, Japan; Feb. 13-17, 2012, 4 pages.

Lei Lei et al.: "Operator Controlled Device-To-Device Communications in LTE-Advanced Networks," IEEE Wireless Communications, IEEE Service Center, Piscataway, NJ, US, vol. 19, No. 3, Jun. 2012 (Jun. 2012), 9 pages.

3GPP Standard; 3GPP TS 36.331,V11.1.0; 3rd Generation Partnership Project; Technical Specification Group Radio Access Network; Evolved Universal Terrestrial Radio Access (E-UTRA); Radio Resource Control (RRC); Protocol specification (Release 11); Sep. 2012; 325 pages.

Fodor et al., "Design Aspects of Network Assisted Device-to-Device Communications" IEEE Communications Magazine, IEEE Service Center, Piscataway, US, vol. 50, No. 3, Mar. 1, 2012, pp. 170-177; 8 pages.

Office Action issued in U.S. Appl. No. 13/621,703 on Nov. 19, 2014.

Office Action issued in U.S. Appl. No. 13/624,736 on Aug. 27, 2014; 14 pages.

International Search Report for Application No. PCT/US2013/026157, dated Jul. 30, 2013, 24 pages.

International Search Report for Application No. PCT/US2013/026174, dated Jul. 17, 2013, 5 pages.

International Search Report for Application No. PCT/US2013/026372, dated Apr. 24, 2013, 3 pages.

International Search Report for Application No. PCT/US2013/026104, dated Jun. 24, 2013, 3 pages.

International Search Report for Application No. PCT/US2013/026356, dated Jun. 19, 2013, 3 pages.

Search Report issued in TW Application No. 102132479 on Nov. 7, 2014, 1 page.

Office Action and Search Report issued in TW Application No. 102132483 on Dec. 25, 2014; 8 pages.

* cited by examiner

USER EQUIPMENT ARCHITECTURE FOR INTER-DEVICE COMMUNICATION IN WIRELESS COMMUNICATION SYSTEMS

TECHNICAL FIELD

The present disclosure generally relates to communications in wireless communication systems, and more particularly, to user equipment architecture for inter-device communications in wireless communication systems.

BACKGROUND

In wireless networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network and the EPC network may forward the data packet to another base station or to the same base station that is serving another UE. Data transfer between the UEs is routed through the base station and the EPC. The communication between the UEs is controlled by the policies set by the operator administering the network.

The UEs may communicate directly with each other using other radio access technology (RAT), such as, wireless local area network (WLAN) or Bluetooth when the UEs are located in close proximity and have access to the other RAT. However, this multi-RAT communication requires the availability of the other RAT and the capability of the UEs to operate in the other RAT. Moreover, handover from cellular technology to other RATs may result in service interruption and dropped calls.

BRIEF DESCRIPTION OF THE DRAWINGS

The accompanying drawings, which are incorporated in and constitute part of this specification, and together with the description, illustrate and serve to explain various examples.

DETAILED DESCRIPTION

The present disclosure is directed to systems, methods, and apparatuses for inter-device communication in cellular wireless communication systems. In the current cellular communication system, data transfer between UEs has to be routed through a base station and a core network. When UEs located in close proximity communicate with each other, it would be advantageous for the UEs to communicate via a direct inter-device communication link between them, instead of transferring the data via a network. By providing a direct inter-device communication link between the UEs, improved overall spectral efficiency may be achieved. Moreover, the direct link between the UEs requires lower transmit power at the UE compared to transmitting to the base station, thereby resulting in battery savings at the UEs. Additionally, communicating over the direct link between the UEs may improve quality of service (QoS).

Although the UE may be able to communicate over a direct communication link using another RAT, such as, WLAN, Bluetooth, etc., it requires availability of the services of the other RAT and also requires implementation of the other RAT at the UE. Furthermore, service interruptions and dropped calls may result from switching or handover between different RATs. Therefore, it may be advantageous to enable communications over the inter-device communication link using the same cellular radio access technology and operating in the same radio band.

Reference will now be made in detail to example approaches implemented according to the disclosure; the examples are illustrated in the accompanying drawings. Wherever possible, the same reference numbers will be used throughout the drawings to refer to the same or like parts.

Figure 1:
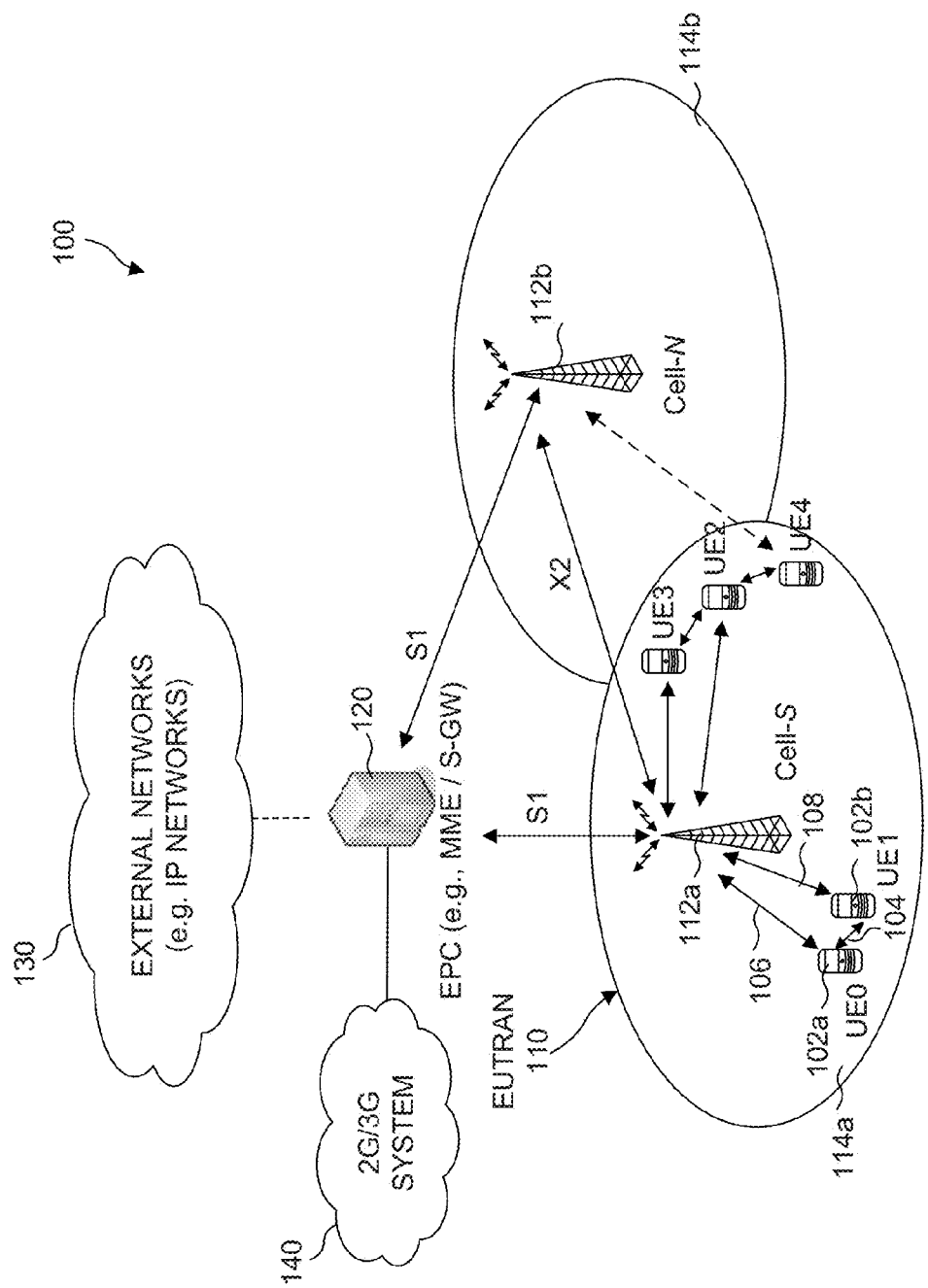
FIG. 1 illustrates an example cellular wireless communication system in which methods and systems consistent with the present disclosure may be implemented.

FIG. 1 illustrates an example cellular wireless communication system 100 in which systems and methods consistent with this disclosure may be implemented. The cellular network system 100 shown in FIG. 1 includes one or more base stations (i.e., 112a and 112b). In the LTE example of FIG. 1, the base stations are shown as evolved Node Bs (eNBs) 112a and 112b, although base stations operate in any wireless communications system, including for example, macro cell, femto cell, relay cell, and pico cell. Base stations are nodes that can relay signals for mobile devices, also referred to herein as user equipment, or for other base stations. The base stations are also referred to as access node devices. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown, one or more mobile electronic devices 102a, 102b operate within the LTE system 100. In some implementations, 2G/3G systems 140, e.g., Global System for Mobile communication (GSM), Interim Standard 95 (IS-95), Universal Mobile Telecommunications System (UMTS) and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. User equipment (UEs) 102a and 102b operate in Cell 114a and are served by eNB 112a. The EUTRAN 110 can include one or more eNBs (e.g., eNB 112a and eNB 112b) and one or more UEs (e.g., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one serving eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b such that handover may be conducted if one or both of the UEs 102a and 102b travels, e.g., from cell 114a to cell 114b. The UEs 102a and 102b may be any wireless electronic device used by an end-user to communicate, for example, within the LTE system 100.

The UEs 102a and 102b may transmit voice, video, multimedia, text, web content and/or any other user/client-specific content. The transmission of some content, e.g., video and web content, may require high channel throughput to satisfy the end-user demand. In some instances, however, the channel between UEs 102a, 102b and eNBs 112a, 112b may be contaminated by multipath fading due to the multiple signal paths arising from many reflections in the wireless environment. Accordingly, the UEs' transmission may adapt to the wireless environment. In short, the UEs 102a and 102b may generate requests, send responses or otherwise communicate in different means with Evolved Packet Core (EPC) 120 and/or Internet Protocol (IP) networks 130 through one or more eNBs 112a and 112b.

In some implementations, the UEs 102a and 102b may communicate over an inter-device communication link when they are located in close proximity to one another, without routing the data through the eNB 112a. The boundary of the distance of the inter-device communication link may be limited by the transmission power of the UEs. In one example, close proximity could be a few meters. In another example, close proximity could be tens of meters. It is also possible that in certain circumstances, the close proximity may mean larger distance such as hundreds of meters. For example, the UEs 102a and 102b may communicate directly over the inter-device communication link 104, instead of communicating with each other through their links with the eNB 112a, i.e., 106 and 108 respectively. The inter-device communication link may also be referred to as a device-to-device (D2D) communication link. The UEs 102a and 102b may simultaneously maintain an active communication link with the eNB 112a such that the UEs 102a and 102b may still receive messages from the eNB or other UEs, when communicating with each other over the direct inter-device link.

Examples of UEs include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all, or at least some, radio related functions in a fixed part of the system. One or more of eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b may directly communicate with one or more UEs 102a, 102b, other eNBs, and the EPC 120.

The eNBs 112a and 112b may be the end point of the radio protocols towards the UEs 102a, 102b and may relay signals between the radio connection and the connectivity towards the EPC 120. The communication interface between the eNB and the EPC is often referred to as an S1 interface. In certain implementations, EPC 120 is a central component of a core network (CN). The CN can be a backbone network, which may be a central part of the telecommunications system. The EPC 120 can include a mobility management entity (MME), a serving gateway (S-GW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The S-GW functions may include user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
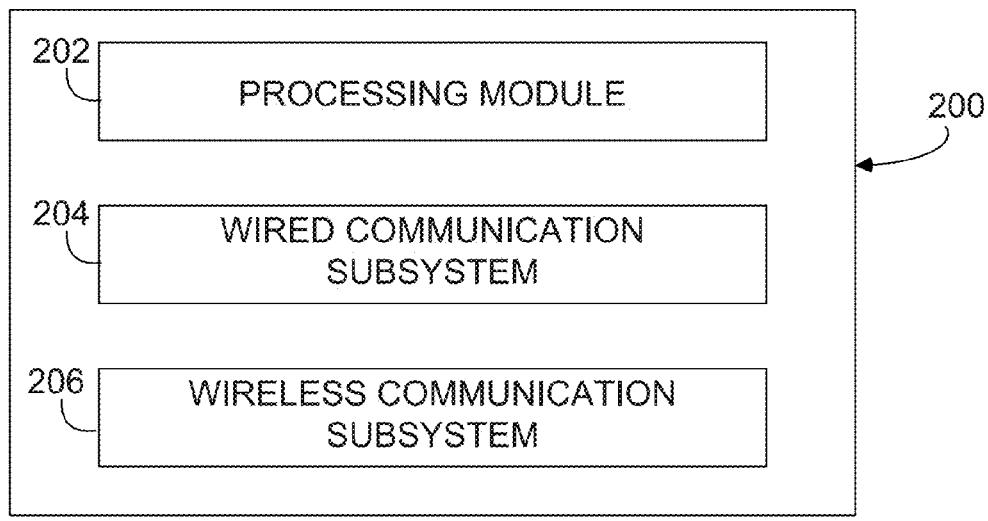
FIG. 2 illustrates an example access node device, in accordance with an example of the present disclosure.

FIG. 2 illustrates an example access node device 200 consistent with certain aspects of this disclosure. The access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing IDC interference. The processing module 202 can also include other auxiliary components, such as random access memory (RAM), read only memory (ROM), secondary storage (for example, a hard disk drive or flash memory). Additionally, the processing module 202 can execute certain instructions and commands to provide wireless or wired communication, using the wired communication subsystem 204 or a wireless communication subsystem 206. One skilled in the art will readily appreciate that various other components can also be included in the example access node device 200 without departing from the principles of the present disclosure.

Figure 3:
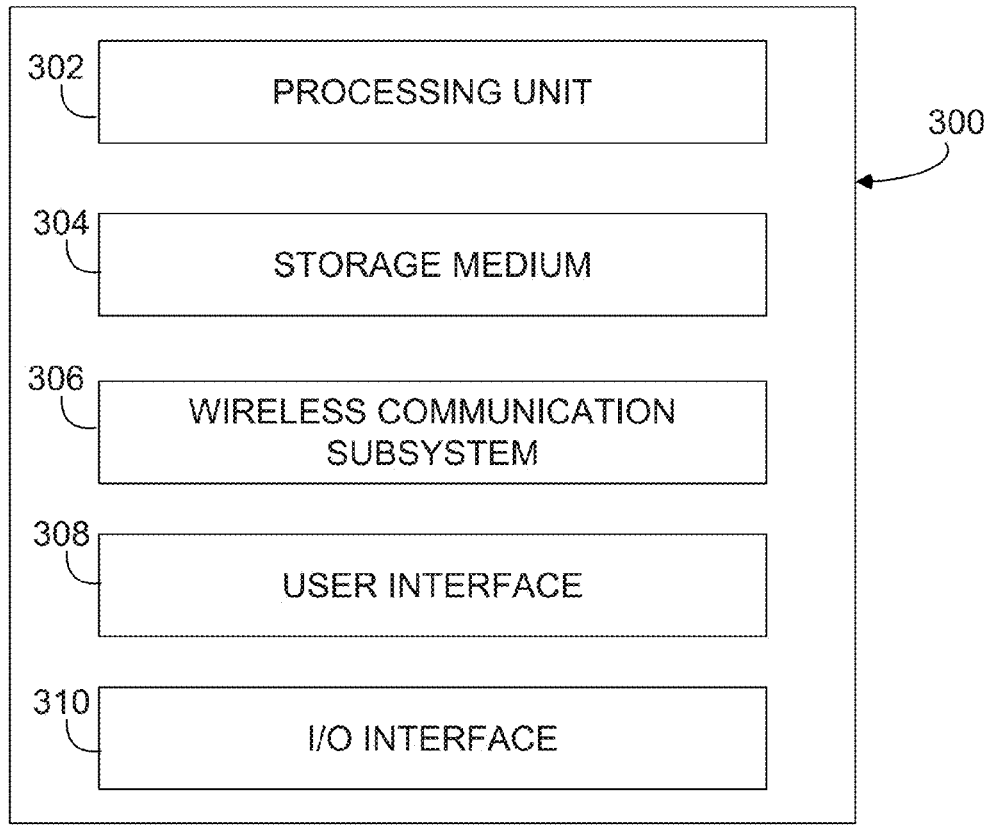
FIG. 3 illustrates an example user equipment device, in accordance with an example of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 may include components and perform functionality similar to the processing module 202 described with regard to FIG. 2. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 may receive or transmit information over a direct inter-device communication link. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone).

The I/O interface 310 can include, for example, a universal serial bus (USB) interface. One skilled in the art will readily appreciate that various other components can also be included in the example UE device 300.

For UEs to communicate over a direct inter-device communication link, an inter-device communication link is enabled between the UEs. The direct inter-device communication link allows data exchange between the UEs, without routing through the base station and the core network. Descriptions will now be made about methods for UE architectures to support the inter-device communication in the cellular wireless communication system, according to certain examples of the present disclosure.

To support the inter-device communication, the UE may need additional functionality built into the device. The direct communication link may use downlink (DL) radio resources or uplink (UL) radio resources or both. The UE should be able to transmit on the DL frequency compatible with DL subframe format if the inter-device communication uses the LTE DL subframe format. Similarly, the UE should be able to receive over the UL frequency in accordance with the UL subframe format if the inter-device communication is enabled by reusing the LTE UL subframe format. The UEs may support inter-device communication based on both UL and DL subframe format. In the present disclosure, the UE is assumed to operate in a half-duplex mode, in which that the UE does not transmit and receive signals at the same frequency band simultaneously. In other words, the UE is prevented to transmit to the base station when listening to other UEs over the inter-device communication link. Also, the UE is prevented to listen to the base station when transmitting to other UEs over the inter-device communication link.

Figure 4:
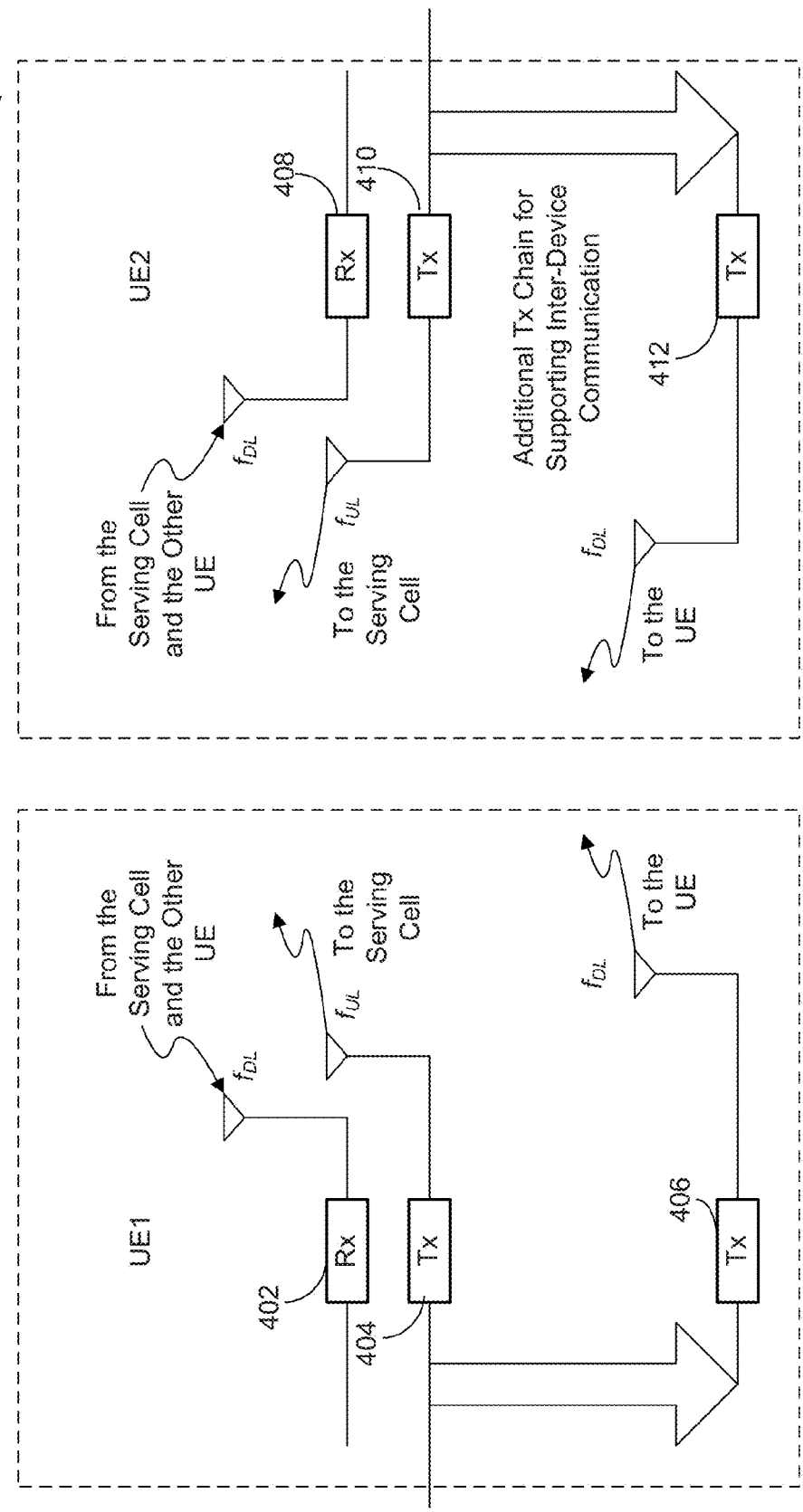
FIG. 4 illustrates an example user equipment architecture for inter-device communication, in accordance with an example of the present disclosure.

FIG. 4 illustrates an example user equipment architecture 400 when the DL frequency ($f_{DL}$) is used for the inter-device communication, in accordance with an example of the present disclosure. As shown in FIG. 4, each UE includes one receive (Rx) chain, i.e., 402, 408, and two transmit (Tx) chains, i.e., 404, 406 for UE1 and 410, 412 for UE2. A radio chain refers to the hardware necessary for transmit/receive signal processing, including for example, radio frequency (RF) processing components, antennas, etc. When the DL frequency is used for the inter-device communication, the UE uses an additional transmit chain to transmit the orthogonal frequency divisional multiplexing (OFDM) subframes compatible with current LTE DL over the inter-device link. The UE, e.g., UE1, may transmit a first signal to a base station using a first transmit chain and transmit a second signal to one or more UEs, e.g. UE2, over one or more inter-device communication links using a second transmit chain. On the other hand, one receive chain is sufficient because the UE can simultaneously receive a DL transmission from the eNB and a DL transmission from another UE over the inter-device communication link.

The DL D2D link resources may be reused by the eNB based on the location of the devices. If the D2D communication link is far from the eNB, the radio resources may be re-used. If two D2D communication links are far apart from each other, the radio resources may be re-used on these D2D communication links as well. When DL resources are used, the additional transmit chain may be of low cost since the transmit power expected for the D2D link is very low. The radio frequency (RF) components of the transmit chain may be made to support low transmit power. For example, the peak transmit power rating of the power amplifier can be very low, which may allow the use of lower-power components. The additional transmit chain may include low power RF hardware connected to the same digital circuit/chipset as the other transmit chain. The digital signal or the output of the digital-to-analog converter (DAC) may be routed to the additional low power transmit chain if the transmission during a specific subframe is directed towards another UE.

The UE should be able to transmit a data packet to the other UE over D2D link compatible with the physical downlink shared channel (PDSCH) format during the designated DL subframe in synchronization with a DL transmission from the serving cell. Since the UEs involved in the inter-device communication are assumed be in close proximity, the receive timing for the D2D transmission should be close to the receiving timing for the eNB transmission at the UE. In some implementations, the receiving UE may have to maintain independent carrier and timing tracking loops for the eNB-to-UE link and for the D2D link. In some other implementations, the receiving UE may maintain one carrier and timing tracking loops for the eNB-to-UE link and for the D2D link. The UE may also maintain one or more offset values for carrier and timing between these two links.

Figure 5:
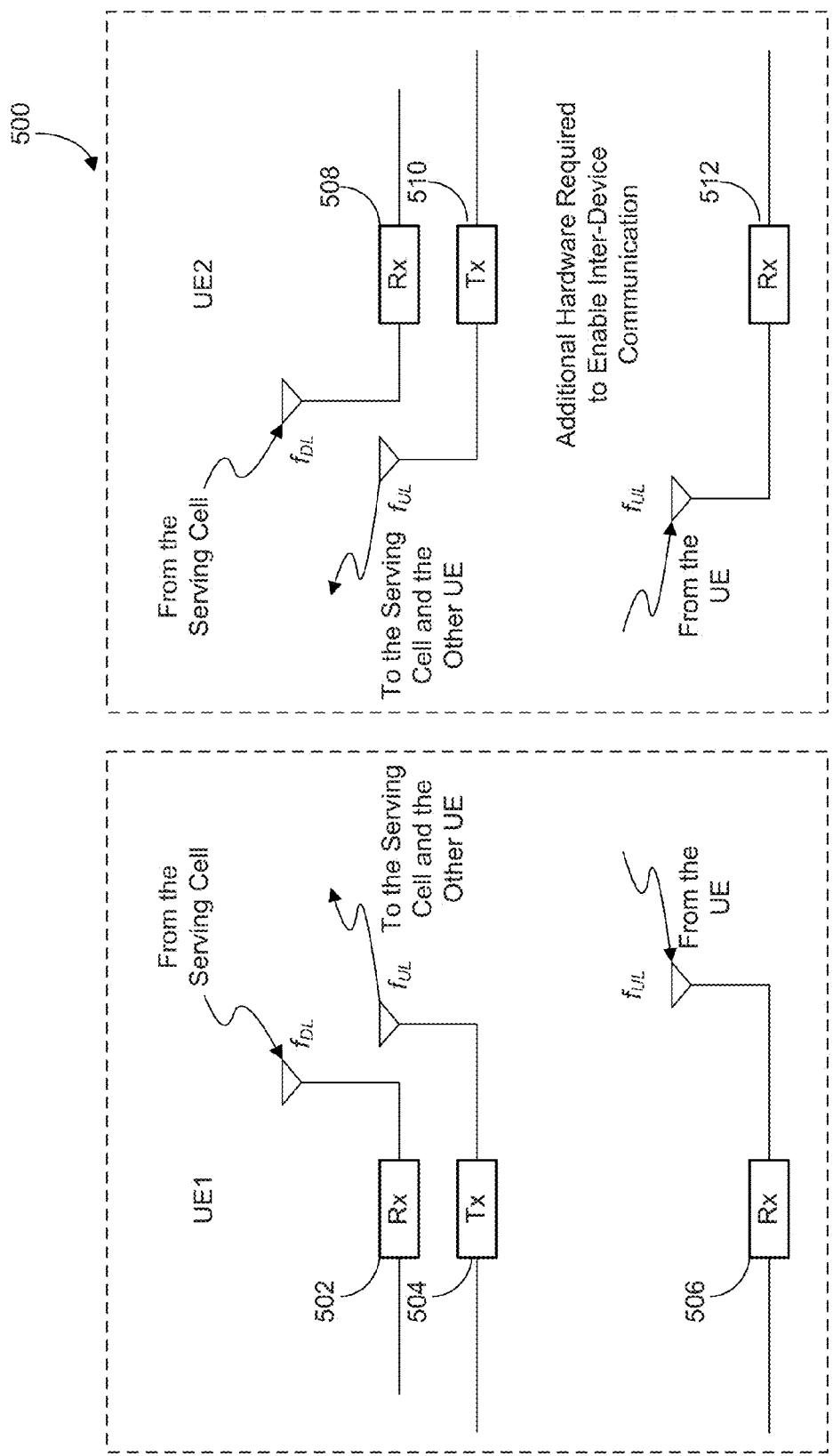
FIG. 5 illustrates another example user equipment architecture for inter-device communication, in accordance with an example of the present disclosure.

FIG. 5 illustrates an example user equipment architecture 500 when the UL frequency ($f_{UL}$) is used for the inter-device communication, in accordance with an example of the present disclosure. As shown in FIG. 5, each UE includes one transmit chain, i.e., 504, 510, and two receive chains, i.e., 502, 506 for UE1 and 508, 512 for UE2. The UE uses an additional receive chain to receive the UL transmission over the inter-device link. For example, the additional receive chain may be configured to receive single-carrier orthogonal frequency divisional multiplex (SC-OFDM) subframes compatible with current LTE UL over the inter-device link. The UE, e.g. UE1, may receive a first signal from a base station using a first receive chain, and receive a second signal from one or more UEs, e.g. UE2, over one or more inter-device communication links using a second receive chain. On the other hand, one transmit chain is sufficient because the UE can simultaneously transmit a UL transmission to the eNB over the eNB-to-UE link and to another UE over the inter-device link.

Figure 6:
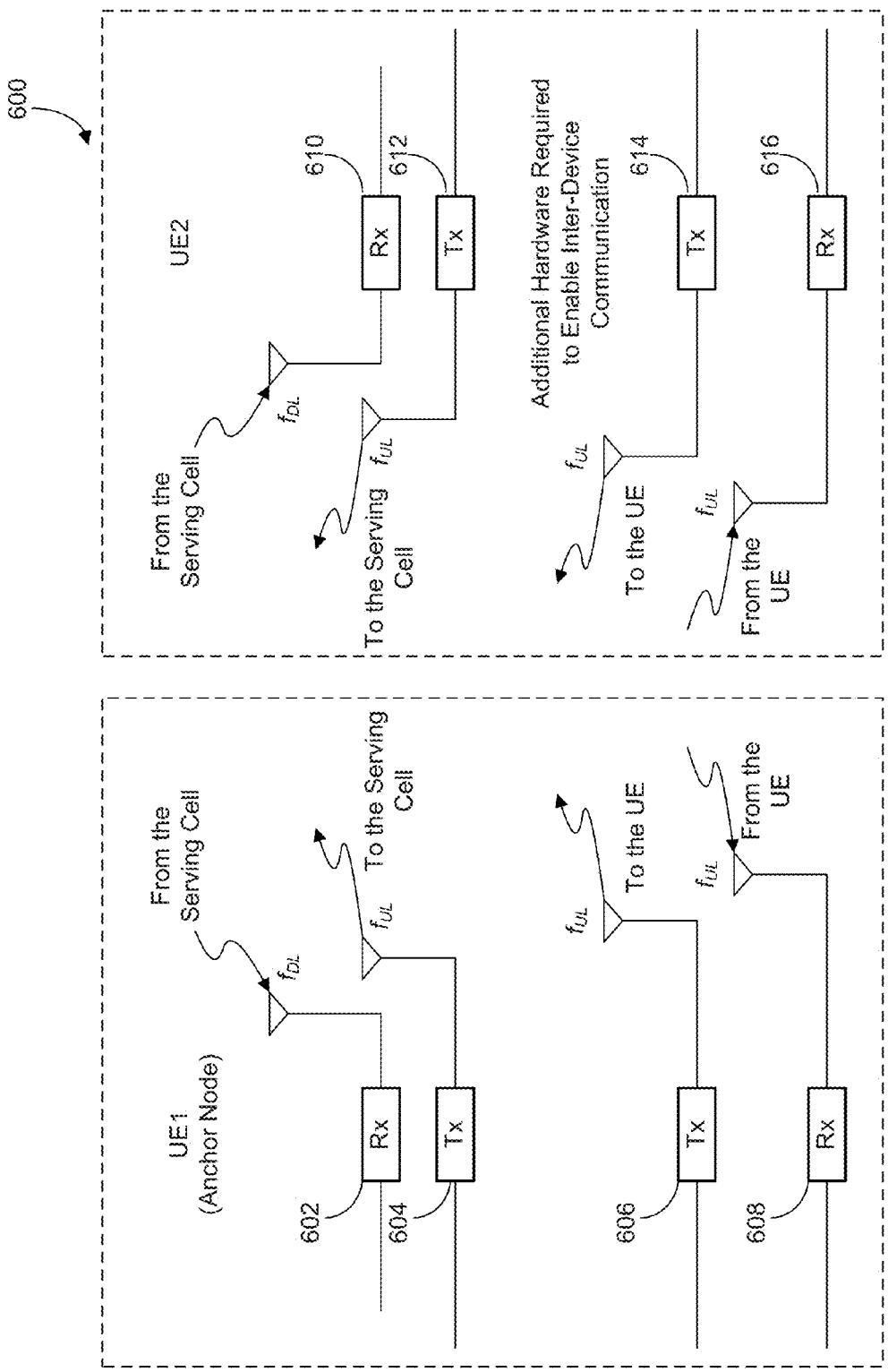
FIG. 6 illustrates yet another example user equipment architecture for inter-device communication, in accordance with an example of the present disclosure.

FIG. 6 illustrates another example user equipment architecture 600 when UL frequency is used for the inter-device communication, in accordance with another example of the present disclosure. As shown in FIG. 6, each UE includes two transmit chains, i.e., 604, 606 for UE1 and 612, 614 for UE2, and two receive chains, i.e., 602, 608 for UE1 and 610, 616 for UE2. The UE may use an additional receive chain e.g., 608 for UE1, 616 for UE2, to receive the UL transmission over the inter-device link. For example, the additional receive chain may be configured to receive the SC-OFDM subframes compatible with current LTE UL over the inter-device link. Further, an additional transmit chain e.g., 606 for UE1, 614 for UE2, may be used by the UE to transmit to other UEs over the inter-device link using the UL frequency. The additional transmit chain may be of low cost since the transmit power expected of this D2D link may be very low.

When UL resources are used for the inter-device link communication, the receiving UE may have to adjust the receive timing for inter-device communication independent from the eNB-to-UE communication link. The receiving timing for the D2D link may be adjusted during the device handshake procedure. Similar procedure may be performed periodically to further adjust the timing during the D2D communications. This further adjustment of the receiving timing may occur infrequently. The cyclic prefix (CP) length may be able to absorb the majority of the timing difference since the distance between the devices may be minimal for the inter-device communications. This timing adjustment may also be executed with a request from eNB.

Figure 7:
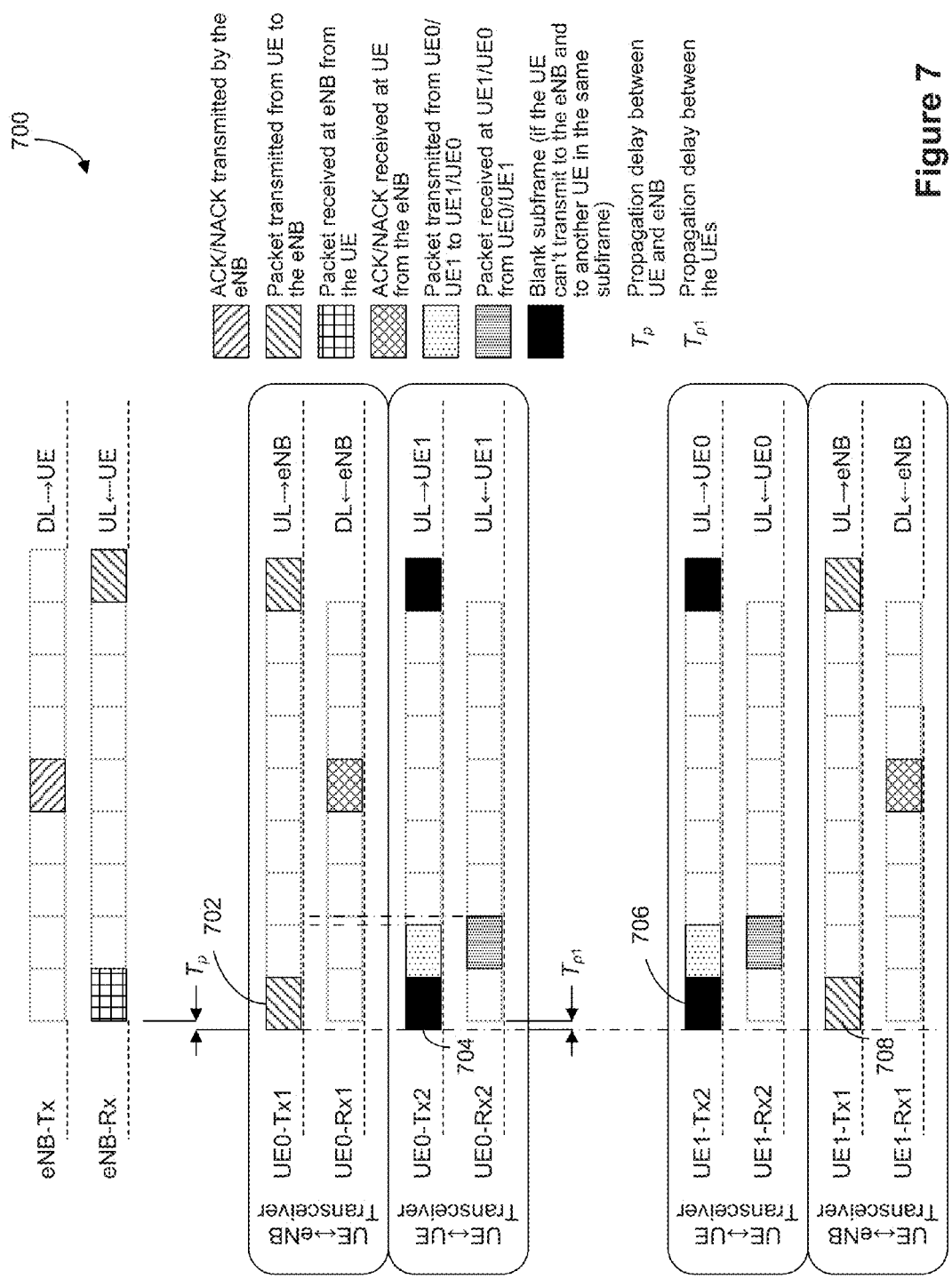
FIG. 7 illustrates an example timing diagram for an inter-device communication link, in accordance with an example of the present disclosure.

FIG. 7 illustrates an example timing diagram 700 when the UL frequency is used for the inter-device communication, in accordance with an example of the present disclosure. In this example, the transmission timing to other UEs on the D2D link is synchronized with the transmission timing to an eNB.

As shown in FIG. 7, the transmit timing of UE transmissions to the eNB and to another UE is synchronized. For example, the transmission timing of UE0-to-eNB link at 702 is aligned with the transmission timing of UE0-to-UE1 link at 704, although 704 is a blank subframe and UE0 is not actually transmitting to UE1 at 704. A blank subframe is shown to indicate that if there is a transmission to the eNB during a subframe, a UE may not be able to transmit to another UE during the same subframe. As shown in FIG. 7, UE0 may transmit to UE1 over the D2D link immediately after the transmission to the eNB at 702. Similarly, the transmission timing of UE1-to-eNB link at 708 is aligned with the transmission timing of UE1-to-UE0 link at 706, although 706 is a blank subframe and UE1 is not actually transmitting to UE0 at 706. In the illustrated Figure, UE0 and UE1 are shown to have exactly the same timing for illustration purpose only. It is to be understood that UE0 and UE1 do not necessarily have the exact the same timing and the described timing schemes with respect to the inter-device link transmission/reception timing are applicable to those scenarios as well.

After receiving an uplink data packet from UE1, UE0 may not be able to transmit to the eNB immediately due to the propagation delay $T_{p1}$ between UE0 and UE1, and possibly different time-advance values for UE0 and UE1. For example, if a guard time is introduced in the UL subframe for the inter-device communication, the time-advance values for UE0 and UE1 may be different. By including a Guard time at the end of the D2D transmission subframe, the UE may finish the transmission to the other UE before the actual subframe ends and can ramp up the receiver to transmit to the eNB in the immediately following subframe. In some scenarios, the D2D receiving UE may be able to transmit UL packet to eNB immediately after receiving a packet from another UE over a D2D link. For example, if the D2D receiving UE is located in the propagation path between D2D transmitting UE and the eNB, in which case the D2D physical uplink shared channel (PUSCH) receive timing and the PUSCH/physical uplink control channel (PUCCH) transmit timing are lined up, the D2D receiving UE may be able to transmit to eNB immediately after receiving a D2D transmission.

Figure 8:
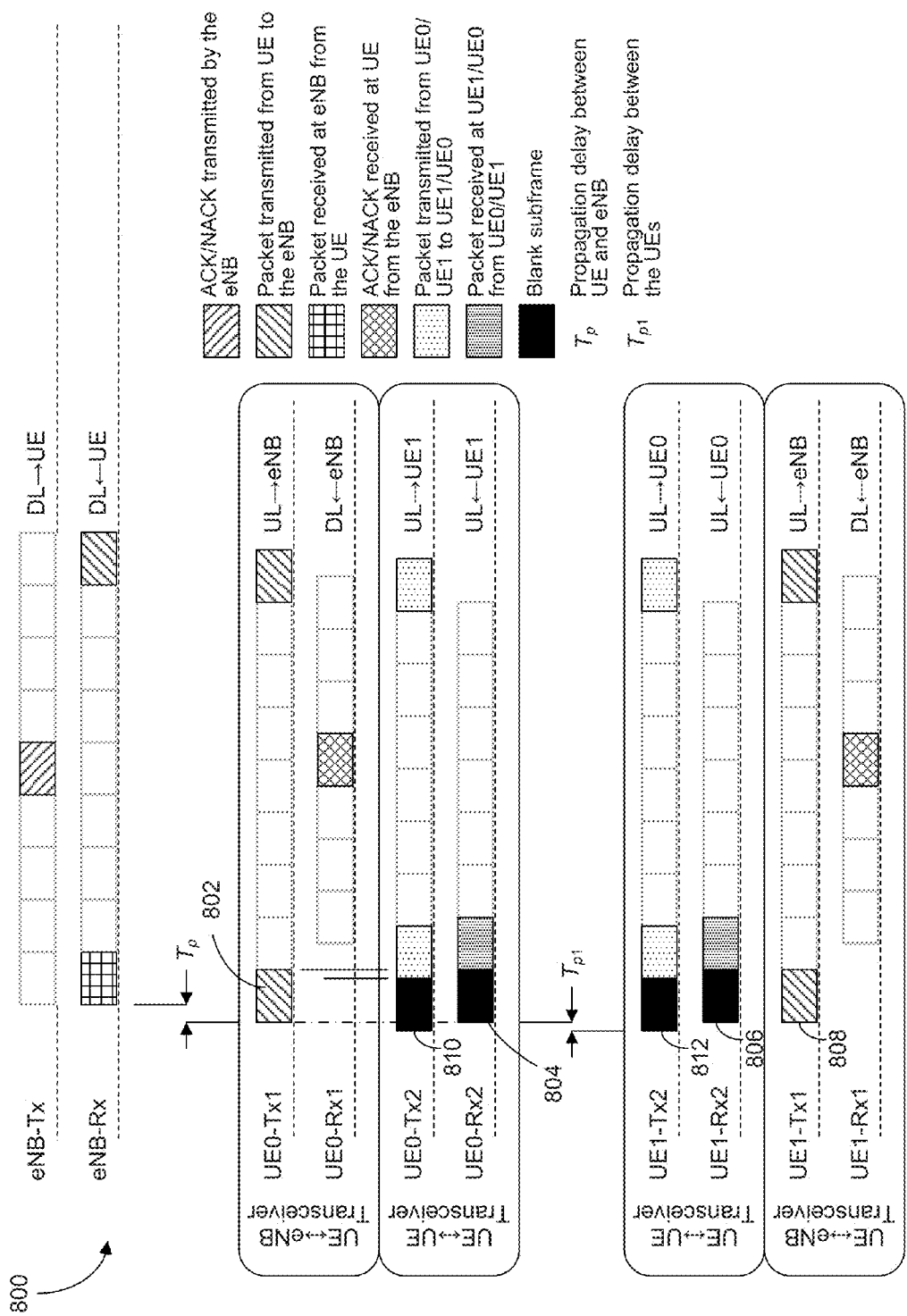
FIG. 8 illustrates another example timing diagram for an inter-device communication link, in accordance with an example of the present disclosure.

FIG. 8 illustrates another example timing diagram 800 when the UL frequency ($f_{UL}$) is used for the inter-device communication, in accordance with another example of the present disclosure. In this example, the UL transmission timing for the inter-device communication can be adjusted such that the D2D reception timing and the transmission timing to the eNB are synchronized at the UE. This timing scheme may be used by UEs having separate transmit chains for the UE-to-eNB link and the D2D link. The UE may have to adjust its D2D link transmission timing in this scheme. D2D link transmission timing may be adjusted during a device handshake/discovery procedure.

As shown in FIG. 8, the UE transmit timing to the eNB and UE receiving timing from another UE over the D2D link are synchronized. For example, the transmission timing of UE0-to-eNB link at 802 is aligned with the receiving timing of UE0-to-UE1 link at 804, although 804 is a blank subframe and UE0 is not actually receiving from UE1 at 804. Here a blank subframe is shown to indicate that if there is a transmission to the eNB during a subframe, UE may not be able to receive from another UE during the same subframe. The transmission timing of UE0 at 810 is adjusted such that the received timing of UE1 at 808 is aligned with the transmission timing to the eNB of UE1 at 812. As shown in FIG. 8, UE0 may not be able to transmit to UE1 over the D2D link immediately after the transmission to the eNB at 802 due to the offset between its transmit timing to the eNB and to another device. Similarly, the transmission timing of UE1-to-eNB link at 808 is aligned with the receiving timing of UE1-to-UE0 link at 806, although 806 is a blank subframe and UE1 is not actually transmitting to UE0 at 806. The transmission timing of UE1 at 812 is adjusted such that the received timing of UE0 at 804 is aligned with the transmission timing to the eNB of UE0 at 802. By including a Guard time at the start of the D2D transmission subframe, the UE can start a transmission to the other UE after the subframe starts, and can ramp up the receiver to transmit to the other UE in the immediately following subframe In FIG. 8, UE0 and UE1 are shown to have exactly the same timing for illustration purpose only. It is to be understood that UE0 and UE1 do not necessarily have the same timing and the described timing schemes with respect to the inter-device link transmission/reception timing are applicable to those scenarios as well.

In some implementations, differently from the above described method, the D2D link transmission timing may be adjusted such that the D2D link receiving timing is aligned with the receiving timing from the eNB. For example, the transmission timing of UE0 over the D2D link may be adjusted such that the receiving timing of the D2D link and the eNB-UE1 link at UE1 are aligned. Similarly, the transmission timing of UE1 over the D2D link may be adjusted such that the receiving timing of the D2D link and the eNB-UE0 link at UE0 are aligned.

The systems and methods described above may be implemented by any hardware, software or a combination of hardware and software having the above described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Method steps may be implemented in an order that differs from that presented herein.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure. Although certain illustrated examples in this disclosure may show only two UEs, the described systems and methods for the inter-device communications can be applied to more than two UEs without departing from the scope of the present disclosure.

What is claimed is:

1. A method at a user equipment (UE) for wireless communication, comprising:
    transmitting a first signal, corresponding to a first message, to a base station using a first transmit chain; and
    transmitting a second signal, corresponding to a second message, to one or more other UEs over one or more inter-device communication links using a second transmit chain;
    receiving a third signal, corresponding to a third message, from the base station; and
    receiving a fourth signal, corresponding to a fourth message, from the one or more other UEs over the one or more inter-device communication links at substantially the same time as receiving the third signal.

2. The method of claim 1, further comprising:
    receiving the third signal from the base station using a receive chain; and
    receiving the fourth signal from the one or more other UEs over the one or more inter-device communication links using the receive chain.

3. The method of claim 1, wherein the UE transmits to and receives from the one or more other UEs using long term evolution (LTE) downlink radio resources.

4. The method of claim 3, wherein the UE transmits to the base station using LTE uplink radio resources and receives from the base station using LTE downlink radio resources.

5. The method of claim 1, wherein a peak transmit power of the second transmit chain is lower than a peak transmit power of the first transmit chain.

6. The method of claim 1, wherein the UE is prevented from receiving from the base station when transmitting to the one or more other UEs over the one or more inter-device communication links.

7. The method of claim 1, wherein the UE is configured in a discontinuous reception (DRX) off duration when transmitting to the one or more other UEs over the one or more inter-device communication links.

8. The method of claim 1, wherein the receive chain includes a first timing tracking loop for synchronization with the base station and a second timing tracking loop for synchronization with the one or more other UEs.

9. The method of claim 1, wherein a guard time is used when the UE transmits to the one or more other UEs over the one or more inter-device communication links.

10. A method at a user equipment (UE) for wireless communication, comprising:
    receiving a first signal, corresponding to a first message, from a base station using a first receive chain; and
    receiving a second signal, corresponding to a second message, from one or more other UEs over one or more inter-device communication links using a second receive chain;
    transmitting a third signal, corresponding to a third message, to the base station; and
    transmitting a fourth signal, corresponding to a fourth message, to the one or more other UEs over the one or more inter-device communication links at substantially the same time as transmitting the third signal.

11. The method of claim 10, further comprising:
    transmitting the third signal to the base station using a transmit chain; and
    transmitting the fourth signal to the one or more other UEs over the one or more inter-device communication links using the transmit chain.

12. The method of claim 11, wherein the UE transmits to and receives from the one or more other UEs using long term evolution (LTE) uplink radio resources.

13. The method of claim 12, wherein the UE transmits to the base station using LTE uplink resources and receives from the base station using LTE downlink radio resources.

14. The method of claim 11, wherein the UE is configured to refrain from transmitting to the base station immediately following the UE receives a transmission from the one or more other UEs over the one or more inter-device communication links.

15. The method of claim 11, wherein the UE is prevented from transmitting to the base station when receiving from the one or more other UEs over the one or more inter-device communication links.

16. The method of claim 10, further comprising:
    transmitting a third signal to the base station using a first transmit chain; and
    transmitting a fourth signal to the one or more other UEs over the one or more inter-device communication links using a second transmit chain.

17. The method of claim 16, wherein the UE transmits to and receives from the one or more other UEs using long term evolution (LTE) uplink radio resources.

18. The method of claim 16, wherein the UE transmits to the base station using LTE uplink radio resources and receives from the base station using LTE downlink radio resources.

19. The method of claim 16, wherein a reception time from the one or more other UEs is synchronized with a transmission time to the base station at the UE.

20. The method of claim 19, wherein the UE is configured to refrain from transmitting to the one or more other UEs immediately following a transmission to the base station.

21. The method of claim 16, wherein the UE is prevented from transmitting to the base station when receiving from the one or more other UEs over the one or more inter-device communication links.

22. The method of claim 16, wherein a peak transmit power of the second transmit chain is lower than a peak transmit power of the first transmit chain.

23. The method of claim 16, wherein a transmission time to the one or more other UEs is synchronized with a reception time from the base station at the UE.

24. A user equipment (UE) for wireless communication, comprising:
  a first transmit chain for transmitting a first signal, corresponding to a first message, to a base station at a first frequency;
  a second transmit chain for transmitting a second signal, corresponding to a second message, to one or more other UEs over one or more inter-device communication links at a second frequency;
  a receive chain for receiving a third signal, corresponding to a third message, from the base station at a third frequency, and for receiving a fourth signal, corresponding to a fourth message, from the one or more other UEs over the one or more inter-device communication links at the third frequency at substantially the same time as receiving the third signal.

25. The UE of claim 24, wherein the UE is prevented from receiving from the base station when transmitting to the one or more other UEs over the one or more inter-device communication links.

26. The UE of claim 24, wherein the UE is configured in a discontinuous reception (DRX) off duration when transmitting to the one or more other UEs over the one or more inter-device communication links.

27. A user equipment (UE) for wireless communication, comprising:
  a first receive chain for receiving a first signal, corresponding to a first message, from a base station at a first frequency;
  a second receive chain for receiving a second signal, corresponding to a second message, from one or more other UEs over one or more inter-device communication links at a second frequency;
  a transmit chain for transmitting a third signal, corresponding to a third message, to the one or more other UEs over the one or more inter-device communication links at a third frequency, and for transmitting a fourth signal, corresponding to a fourth message, to the base station at the third frequency at substantially the same time as transmitting the third signal.

\* \* \* \* \*